(12) United States Patent
Clouin et al.

(10) Patent No.: US 9,938,154 B2
(45) Date of Patent: Apr. 10, 2018

(54) PRECIPITATED SILICA PRODUCTION PROCESS

(75) Inventors: Malika Clouin, Paris (FR); Sylvaine Neveu, Paris (FR); Joël Racinoux, Rochetaillée-sur-Saône (FR)

(73) Assignee: Rhodia Operations, Aubervilliers (FR)

( * ) Notice: Subject to any disclaimer, the term of this patent is extended or adjusted under 35 U.S.C. 154(b) by 767 days.

(21) Appl. No.: 13/811,905

(22) PCT Filed: Jul. 25, 2011

(86) PCT No.: PCT/EP2011/062734
§ 371 (c)(1),
(2), (4) Date: Mar. 19, 2013

(87) PCT Pub. No.: WO2012/010712
PCT Pub. Date: Jan. 26, 2012

(65) Prior Publication Data
US 2013/0171051 A1   Jul. 4, 2013

(30) Foreign Application Priority Data
Jul. 23, 2010 (FR) ...................... 10 03098

(51) Int. Cl.
*C01B 33/12* (2006.01)
*C01B 33/193* (2006.01)

(52) U.S. Cl.
CPC .......... *C01B 33/128* (2013.01); *C01B 33/193* (2013.01)

(58) Field of Classification Search
CPC ...... C01B 33/128; C01B 33/193; C01B 33/12
See application file for complete search history.

(56) References Cited

U.S. PATENT DOCUMENTS

| | | | |
|---|---|---|---|
| 5,034,207 A | 7/1991 | Kerner et al. | |
| 5,403,570 A * | 4/1995 | Chevallier | C01B 33/193 423/339 |
| 5,871,867 A | 2/1999 | Rausch et al. | |
| 6,107,226 A | 8/2000 | Chevallier | |
| 6,335,396 B1 | 1/2002 | Chevallier et al. | |
| 2007/0224133 A1* | 9/2007 | McGill | A61K 8/25 424/49 |
| 2009/0076210 A1* | 3/2009 | Cochet | C08K 9/02 524/444 |
| 2010/0284884 A1* | 11/2010 | Pryor | B82Y 30/00 423/335 |
| 2013/0171051 A1* | 7/2013 | Clouin | C01B 33/128 423/339 |

FOREIGN PATENT DOCUMENTS

| | | |
|---|---|---|
| EP | 0 341 383 A2 | 11/1989 |
| EP | 0 396 450 A1 | 11/1990 |
| EP | 0 520 862 A1 | 12/1992 |
| EP | 0 754 650 A1 | 1/1997 |
| FR | 1 078 134 | 5/1954 |
| WO | 95/09127 A1 | 4/1995 |

OTHER PUBLICATIONS

International Search Report dated Sep. 21, 2011, by the European Patent Office as the International Searching Authority in International Patent Application No. PCT/EP2011/062734.

Written Opinion of the International Searching Authority dated Jan. 23, 2013, in corresponding International Patent Application No. PCT/EP2011/062734.

* cited by examiner

*Primary Examiner* — Melvin C Mayes
*Assistant Examiner* — Smita Patel

(57) ABSTRACT

A precipitated silica production process that includes a precipitation reaction between a silicate and an acid is described, in which the acid used in at least one of the steps of the process is a concentrated acid.

13 Claims, No Drawings

PRECIPITATED SILICA PRODUCTION PROCESS

CROSS-REFERENCE TO PRIOR APPLICATIONS

This application is a National Stage of PCT/EP2011/062734, filed Jul. 25, 2011, and designating the United States (published in French on Jan. 26, 2012, as WO 2012/010712 A1), which claims priority to FR 10/03098, filed Jul. 23, 2010, each hereby expressly incorporated by reference in its entirety and each assigned to the assignee hereof.

The present invention relates to a novel process for preparing precipitated silica.

It is known practice to use precipitated silicas as a catalyst support, as an absorbent for active materials (in particular supports for liquids, for example that are used in food, such as vitamins (especially vitamin E), choline chloride), as a viscosity enhancer, texturizer or anticaking agent, as a battery separator element, and as an additive for toothpaste or paper.

Precipitated silicas may also be used as reinforcing fillers in silicone matrices (for example for covering electrical cables) or in compositions based on natural or synthetic polymer(s), in particular elastomer(s), especially diene elastomer(s), for example for tires, footwear soles, floor coverings, gas barriers, fire retardant materials, and also technical parts such as rollers for cableways, seals for domestic electrical appliances, seals for liquid or gas pipes, braking system seals, sheathings, cables and transmission belts.

It is thus known practice to prepare via certain processes, using a precipitation reaction between a silicate and a dilute acid, precipitated silicas that have a good ability to disperse (dispersibility) in the polymer (elastomer) compositions and good reinforcing properties, making it possible to impart to said compositions in which they are incorporated a very satisfactory compromise of properties, in particular as regards their mechanical, rheological and/or dynamic properties.

The main objective of the present invention is to propose a novel process for preparing precipitated silica, which can be used as a reinforcing filler in the polymer (elastomer) compositions, that constitutes an alternative to these known processes for preparing precipitated silica.

More preferably, one of the objectives of the present invention consists in providing a process which, while having an improved productivity, in particular at the level of the precipitation reaction, especially with respect to these prior art preparation processes using, as acid, a dilute acid, makes it possible to obtain precipitated silicas having similar physicochemical characteristics and properties, especially as regards their pore distribution, their ability to deagglomerate and disperse (dispersibility) in the polymer (elastomer) compositions and/or their reinforcing properties, to those of the precipitated silicas obtained by these prior art preparation processes.

Another objective of the invention preferably consists, at the same time, in reducing the amount of energy consumed and/or the amount of water used during the preparation of precipitated silica, especially with respect to these prior art processes.

Especially in view of these objectives, the subject of the invention is a novel process for preparing precipitated silica, preferably having a good ability to disperse (dispersibility) in the polymer (elastomer) compositions and good reinforcing properties, comprising the precipitation reaction between a silicate and at least one acid, whereby a suspension of precipitated silica is obtained, followed by the separation and drying of this suspension, wherein:

the precipitation reaction is carried out according to the following successive steps:
  (i) an initial stock comprising a silicate and an electrolyte is formed, the concentration of silicate (expressed as $SiO_2$) in said initial stock being (greater than 0 g/l and) less than 100 g/l and, preferably, the concentration of electrolyte in said initial stock being (greater than 0 g/l and) less than 19 g/l, in particular less than 18 g/l, especially less than 17 g/l, for example less than 15 g/l (while usually being greater than 6 g/l),
  (ii) an acid is added to said stock until a pH value of the reaction medium of at least 7, in particular between 7 and 8.5, is obtained,
  (iii) an acid and a silicate are added simultaneously to the reaction medium,
  (iv) an acid is added to the reaction medium, in particular until a pH value of the reaction medium of between 3.0 and 6.5, especially between 4.0 and 5.5, is obtained,
a suspension, preferably having a solids content of at most 24% by weight, is dried,
process wherein, in at least step (iii), the acid used is a concentrated acid, advantageously concentrated sulfuric acid, that is to say sulfuric acid having a concentration of at least 80% by weight, preferably of at least 90% by weight.

Thus, according to one of the essential features of the invention, taken in combination with a sequence of steps under specific conditions, in particular a certain concentration of silicate and of electrolyte in the initial stock and also, preferably, a suitable solids content of the suspension to be dried, the acid used in the whole of step (iii) is a concentrated acid, advantageously concentrated sulfuric acid, that is to say sulfuric acid having a concentration of at least 80% by weight (and in general of at most 98% by weight), preferably of at least 90% by weight; in particular, its concentration is between 90% and 98% by weight, for example between 91% and 97% by weight.

The acid used in steps (ii) and (iv) may then be, for example, a dilute acid, advantageously dilute sulfuric acid, that is to say having a concentration of much less than 80% by weight, in this instance a concentration of less than 20% by weight (and in general of at least 4%), in particular of less than 14% by weight, especially of at most 10% by weight, for example between 5% and 10% by weight.

However, according to one highly preferred variant of the invention, the acid used in step (iv) is also a concentrated acid as mentioned above.

While, within the context of this highly preferred variant of the invention, the acid used in the whole of step (ii) may then be, for example, a dilute acid as described above, it may be advantageous, in this variant of the invention, for, in one part of step (ii), in general in a second and last part of this step (ii), the acid used to also be a concentrated acid as mentioned above (the acid used in the other part of step (ii) being, for example, a dilute acid as described above). Thus, in this step (ii) the acid used until the gel point is reached in the reaction medium (the gel point corresponding to a sudden increase in the turbidity of the reaction medium characteristic of an increase in the size of the objects) may be a dilute acid as mentioned above, advantageously dilute sulfuric acid (that is to say having a concentration of much less than 80% by weight, in this instance a concentration of less than 20% by weight, in general of less than 14% by weight, in particular of at most 10% by weight, for example between 5% and 10% by weight) and the acid used after reaching the gel point in the reaction medium may be a concentrated acid as mentioned above, advantageously concentrated sulfuric acid, that is to say sulfuric acid having a concentration of at least 80% by weight, preferably of at least 90% by weight, in particular between 90% and 98% by weight. Likewise, in this step (ii), the acid used in the first x minutes of step (ii), with x being between 15 and 25, for example equal to 20, may be a dilute acid as mentioned above and the acid used after the first x minutes of step (ii), with x being between 15 and 25, for example equal to 20, may be a concentrated acid as mentioned above.

Within the context of this highly preferred variant of the invention, the acid used in the whole of step (ii) may also be a concentrated acid as mentioned above, that is to say having a concentration of at least 80% by weight, preferably of at least 90% by weight, in particular between 90% and 98% by weight. In the case of this use, water may optionally be added to the initial stock, in particular either before step (ii) or during step (ii).

Preferably, in the process according to the invention, the concentration of silicate (expressed as $SiO_2$) in the initial stock, which is less than 100 g/l, may be at least 80 g/l. It may especially be thus within the context of the highly preferred variant of the invention described above (concentrated acid used throughout steps (iii) and (iv)) when one part of step (ii) is not carried out with concentrated acid.

Even though this is not necessarily a preferred embodiment of the process of the invention, the concentration of silicate (expressed as $SiO_2$) in the initial stock may be less than 80 g/l. It may especially be thus within the context of the highly preferred variant of the invention described above (concentrated acid used throughout steps (iii) and (iv)) when the whole of step (ii) is carried out with concentrated acid.

In the process according to the invention, use is generally made, as acid(s) (concentrated acid or dilute acid), of an organic acid, such as acetic acid, formic acid or carbonic acid, or, preferably, of an inorganic acid, such as sulfuric acid, nitric acid, phosphoric acid or hydrochloric acid.

If use is made, as concentrated acid, of concentrated acetic acid or concentrated formic acid, then their concentration is at least 90% by weight.

If use is made, as concentrated acid, of concentrated nitric acid, then its concentration is at least 60% by weight.

If use is made, as concentrated acid, of concentrated phosphoric acid, then its concentration is at least 75% by weight.

If use is made, as concentrated acid, of concentrated hydrochloric acid, then its concentration is at least 30% by weight.

However, very advantageously, use is made, as acid(s), of sulfuric acid(s), the concentrated sulfuric acid then used having a concentration such as already mentioned in the account above.

Use may furthermore be made, as silicate, of any common form of silicates, such as metasilicates, disilicates and advantageously an alkali metal silicate, in particular sodium or potassium silicate.

The silicate may have a concentration (expressed as $SiO_2$) of between 40 and 330 g/l, for example between 60 and 300 g/l.

Preferably, use is made, as silicate, of sodium silicate.

In the case where use is made of sodium silicate, the latter generally has an $SiO_2/Na_2O$ weight ratio of between 2 and 4, in particular between 2.4 and 3.9, for example between 3.1 and 3.8.

As regards the electrolyte contained in the initial stock (step (i)), this term is understood here in its generally accepted meaning, i.e. it means any ionic or molecular substance which, when it is in solution, decomposes or dissociates to form ions or charged particles. Mention may be made, as electrolyte, of a salt from the group of alkali metal salts and alkaline-earth metal salts, in particular the salt of the starting silicate metal and of the acid, for example sodium chloride in the case of the reaction of a sodium silicate with hydrochloric acid or, preferably, sodium sulfate in the case of the reaction of a sodium silicate with sulfuric acid.

The addition of acid in step (ii) leads to a correlative drop in the pH of the reaction medium and is carried out until a pH value of the reaction medium of at least 7, in particular between 7 and 8.5, for example between 7.5 and 8.5 is reached.

Once the desired pH value is reached, the simultaneous addition of step (iii) is then carried out.

This simultaneous addition is generally carried out in such a way that the pH value of the reaction medium is always equal (to within ±0.1) to that reached at the end of step (ii).

At the end of step (iv) a maturing of the reaction medium (aqueous suspension) obtained may be carried out, at the pH obtained at the end of step (iv), and in general with stirring, for example for 2 to 45 minutes, in particular for 3 to 30 minutes.

Steps (i) to (iv) are generally carried out with stirring.

Likewise, all the steps (i) to (iv) are customarily performed between 75° C. and 97° C., preferably between 80° C. and 96° C.

According to one embodiment of the invention, whether step (ii) is carried out (completely or partly) or is not carried out with concentrated acid, the temperature at the end of the reaction is higher than the temperature at the start of the reaction: thus, the temperature at the start of the reaction (for example during step (i) and part of step (ii)) is preferably held between 75° C. and 90° C., and then the temperature is increased, preferably up to a value between 90° C. and 97° C., at which value it is held (for example during part of step (ii) and during steps (iii) and (iv)) until the end of the reaction.

According to another embodiment of the invention, for example (but not uniquely) when part of step (ii) is not carried out with concentrated acid, all of steps (i) to (iv) may be carried out at a constant temperature.

In the process according to the invention, at the end of step (iv), optionally followed by a maturing step, a silica slurry is obtained, which is then separated (liquid-solid separation).

This separation normally comprises a filtration (with, if necessary, a washing operation) carried out by means of any suitable method, for example by means of a belt filter, a vacuum filter or, preferably, a filter press.

In general, this separation comprises, after the filtration, a liquefaction, it being possible for said liquefaction to then be carried out in the presence of at least one aluminum compound and, optionally, in the presence of an acid (in the latter case, the aluminum compound and said acid are advantageously added simultaneously).

The liquefaction operation, which can be carried out mechanically, for example by passing the filtration cake through a mill of colloid or bead type, makes it possible in particular to lower the viscosity of the suspension to be dried (in particular to be sprayed) subsequently.

The aluminum compound generally consists of an alkali metal aluminate, especially potassium aluminate or preferably sodium aluminate.

The suspension of precipitated silica thus recovered (filter cake, in general disintegrated) is then dried.

Preferably, in the preparation process in accordance with the invention, this suspension must have, immediately before it is dried, a solids content of at most 24% by weight, in particular of at most 23% by weight, for example of at most 22% by weight.

This drying operation can be carried out according to any means known per se.

Preferably, the drying operation is carried out by atomization. To this end, use may be made of any type of suitable atomizer, in particular a rotary, nozzle, liquid pressure or two-fluid atomizer. In general, when the filtration is carried out using a filter press, a nozzle atomizer is used and, when the filtration is carried out using a vacuum filter, a rotary atomizer is used.

When the drying operation is carried out using a nozzle atomizer, the precipitated silica capable of then being obtained usually exists in the form of substantially spherical beads.

On conclusion of this drying operation, it is optionally possible to carry out a step of milling the product recovered; the precipitated silica capable of then being obtained generally exists in the form of a powder.

When the drying operation is carried out using a rotary atomizer, the precipitated silica capable of then being obtained can exist in the form of a powder.

Finally, the dried (in particular by a rotary atomizer) or milled product as indicated above can optionally be subjected to an agglomeration step, which consists, for example, of a direct compression, a wet granulation (that is to say, with use of a binder, such as water, suspension of silica, etc.), an extrusion or, preferably, a dry compacting. When the latter technique is employed, it can prove to be opportune, before carrying out the compacting, to deaerate (operation also referred to as predensifying or degassing) the pulverulent products so as to remove the air included in the latter and to provide more uniform compacting.

The precipitated silica capable of then being obtained by this agglomeration step generally exists in the form of granules.

The implementation of the preparation process according to the invention, particularly when the concentrated acid used is concentrated sulfuric acid, especially makes it possible to obtain during said process (at the end of step (iv)) a suspension that is more concentrated in precipitated silica than that obtained by an identical process using only dilute acid, and therefore to obtain a gain in productivity of precipitated silica (which may reach for example at least 10% to 40%) in particular in the precipitation reaction (i.e. at the end of step (iv)), while surprisingly being accompanied by the production of precipitated silica having a good ability to disperse (dispersibility) in the polymer (elastomer) compositions; more generally, the precipitated silicas obtained by the process according to the invention preferably have physicochemical characteristics and properties, especially as regards their pore distribution, their ability to deagglomerate and disperse (dispersibility) in the polymer (elastomer) compositions and/or their reinforcing properties, comparable to those of the precipitated silicas obtained by an identical process using only dilute acid.

Advantageously, at the same time, especially when the concentrated acid used is concentrated sulfuric acid, the process according to the invention enables, relative to an identical process using only dilute acid, a saving (which may reach for example at least 20% to 60%) in the energy consumption (in the form of live steam for example), in particular in the precipitation reaction (i.e. at the end of step (iv)), due to a reduction in the amounts of water involved and the exothermicity linked to the use of concentrated acid. Moreover, the use of concentrated acid makes it possible to decrease (for example by at least 25%) the amount of water needed for the reaction, especially due to the reduction in the amount of water used for the preparation of the acid.

The precipitated silica obtained by the process according to the invention is advantageously highly dispersible, that is to say that, in particular, it exhibits a very great ability to deagglomerate and disperse (dispersibility) in a polymer matrix, which can be observed in particular by electron or optical microscopy on thin sections.

One of the parameters of the precipitated silica obtained by the process according to the invention may lie in the distribution of its pore volume and in particular in the distribution of the pore volume which is generated by the pores having diameters of less than or equal to 400 Å. The latter volume corresponds to the useful pore volume of the fillers employed in the reinforcement of elastomers. In general, the analysis of the porograms shows that this silica preferably has a pore distribution such that the pore volume generated by the pores having a diameter of between 175 and 275 Å (V2) represents at least 50%, in particular at least 60%, of the pore volume generated by the pores with diameters of less than or equal to 400 Å (V1).

The pore volumes and pore diameters are measured by mercury (Hg) porosimetry using a MICROMERITICS Autopore 9520 porosimeter and are calculated by the WASHBURN relationship with a contact angle theta equal to 130° and a surface tension gamma equal to 484 Dynes/cm.

The precipitated silica prepared by the process according to the invention may be in any physical state, that is to say that it may be in the form of microbeads (substantially spherical beads), powder or granules.

It can thus be in the form of substantially spherical beads with a mean size of at least 80 µm, preferably of at least 150 µm, in particular of between 150 and 270 µm; this mean size is determined according to the standard NF X 11507 (December 1970) by dry sieving and determination of the diameter corresponding to a cumulative oversize of 50%.

It may be in the form of a powder with a mean size of at least 3 µm, in particular of at least 10 µm, preferably of at least 15 µm.

It may be in the form of granules (generally of substantially parallelepipedal shape) with a size of at least 1 mm, for example of between 1 and 10 mm, in particular along the axis of their greatest length.

When the precipitated silica obtained by the process according to the invention is in the form of granules, it preferably has a pore distribution such that the pore volume generated by the pores having a diameter of between 175 and 275 Å (V2) represents at least 60% of the pore volume generated by the pores with diameters of less than or equal to 400 Å (V1).

The precipitated silica prepared by the process according to the invention preferably has a CTAB specific surface area between 100 and 240 $m^2/g$, in particular between 140 and 200 $m^2/g$, for example between 140 and 180 $m^2/g$.

Likewise, it preferably has a BET specific surface area between 100 and 240 $m^2/g$, in particular between 140 and 200 $m^2/g$, for example between 150 and 190 $m^2/g$.

The CTAB specific surface area is the external surface area, which can be determined according to the NF T 45007 method (November 1987). The BET specific surface area can be measured according to the BRUNAUER-EMMETT-TELLER method described in "The Journal of the American Chemical Society", vol. 60, page 309 (1938) and corresponding to the standard NF T 45007 (November 1987).

The ability to disperse (and to deagglomerate) of the precipitated silicas obtained by the process according to the invention can be assessed by means of the following test, by a particle size measurement (by laser diffraction) carried out on a suspension of silica deagglomerated beforehand using ultrasound (cleavage of the objects from 0.1 to a few tens of microns). The deagglomeration under ultrasound is carried out using a VIBRACELL BIOBLOCK (750 W) sonicator equipped with a probe with a diameter of 19 mm. The particle size measurement is carried out by laser diffraction on a SYMPATEC particle sizer employing the Fraunhofer theory.

2 grams of silica are weighed into a pillbox (height: 6 cm and diameter: 4 cm) and the mixture is made up to 50 grams by the addition of deionized water: an aqueous 4% silica suspension is thus produced, which suspension is homogenized by magnetic stirring for 2 minutes. Deagglomeration under ultrasound is then carried out as follows: the probe being immersed over a length of 4 cm, it is operated for 5 minutes and 30 seconds at 80% of its nominal power (amplitude). The particle size measurement is then carried out by introducing, into the vessel of the particle sizer, a volume V (expressed in ml) of the homogenized suspension necessary in order to obtain an optical density of the order of 20.

The value of the median diameter $Ø_{50}$ which is obtained according to this test decreases in proportion as the ability of the silica to deagglomerate increases.

A deagglomeration factor $F_D$ is given by the equation:

$F_D = 10 \times V$/optical density of the suspension measured by the particle sizer (this optical density is of the order of 20).

This deagglomeration factor $F_D$ is indicative of the content of particles with a size of less than 0.1 µm which are not detected by the particle sizer. This factor increases in proportion as the ability of the silica to deagglomerate increases.

In general, the precipitated silicas prepared by the process according to the invention have a median diameter $Ø_{50}$, after deagglomeration under ultrasound, of less than 5 µm, in particular of less than 4.5 µm, especially of less than 4 µm, for example of less than 3 µm.

They usually have an ultrasound deagglomeration factor $F_D$ of greater than 5.5 ml, in particular of greater than 6.5 ml, for example of greater than 10 ml.

Their DOP oil uptake may be between 180 and 350 ml/100 g, in particular in the case where they are in powder form. The DOP oil uptake can be determined according to the standard ISO 787/5 using dioctyl phthalate.

The precipitated silica prepared by the process according to the invention may be used in many applications.

It may be used, for example, as a catalyst support, as an absorbent for active materials (in particular a support for liquids, especially that are used in food, such as vitamins (vitamin E), choline chloride), in polymer, especially elastomer or silicone compositions, as a viscosity enhancer, texturizer or anticaking agent, as a battery separator element, and as an additive for toothpaste, concrete or paper.

However, it finds a particularly advantageous application in the reinforcement of natural or synthetic polymers.

The polymer compositions in which it may be used, especially as a reinforcing filler, are generally based on one or more polymers or copolymers, in particular on one or more elastomers, preferably having at least one glass transition temperature between −150° C. and +300° C., for example between −150° C. and +20° C.

As possible polymers, mention may be made especially of diene polymers, in particular diene elastomers.

Mention may be made, as nonlimiting examples of finished articles based on said polymer compositions, of footwear soles, tires, floor coverings, gas barriers, fire retardant materials, and also technical parts such as rollers for cableways, seals for domestic electrical appliances, seals for liquid or gas pipes, braking system seals, (flexible) pipes, sheathings (especially cable sheathings), cables, engine supports, conveyor belts and transmission belts.

The following examples illustrate the invention without, however, limiting the scope thereof.

EXAMPLE 1 (COMPARATIVE)

The following are introduced into a stainless steel reactor equipped with an impeller stirring system and with live steam heating in the reaction medium:

637 liters of water, 14.1 kg of $Na_2SO_4$ (electrolyte), 362 liters of aqueous sodium silicate, having an $SiO_2/Na_2O$ weight ratio equal to 3.5 and a density at 20° C. equal to 1.230.

The concentration of silicate (expressed as $SiO_2$) in the stock is then 86 g/l. The mixture is brought to a temperature of 83° C. while keeping it stirred.

Then 462 liters of dilute sulfuric acid having a density at 20° C. equal to 1.050 (sulfuric acid with a concentration by weight equal to 7.7%) are introduced therein. The dilute acid is introduced at a flow rate of 529 l/h for the first 20 minutes of the reaction; the flow rate is then increased to 1056 l/h until the pH of the reaction medium reaches a value (measured at its temperature) equal to 8.0.

The reaction temperature is 83° C. for the first 20 minutes of the reaction; it is then brought from 83° C. to 92° C. over approximately 15 minutes, then held at 92° C. until the end of the reaction.

Next, 87.8 liters of aqueous sodium silicate of the type described above and 119 liters of sulfuric acid, also of the type above, are introduced together into the reaction medium, this simultaneous introduction of dilute acid and silicate being carried out so that the pH of the reaction medium, during this period of introduction, is always equal to 8.0±0.1.

After introducing all of the silicate, the dilute acid continues to be introduced, at a flow rate of 432 l/h, for 6 minutes.

This additional introduction of acid then brings the pH of the reaction medium to a value equal to 4.8.

The total duration of the reaction is 60 minutes.

A slurry of precipitated silica is thus obtained, which is filtered and washed using a filter press so that a silica cake is finally recovered, the moisture content of which is 77% (therefore a solids content of 23% by weight). This cake is then fluidized by mechanical and chemical action (addition of an amount of sodium aluminate corresponding to an $Al/SiO_2$ weight ratio of 0.22%). After this disintegrating operation, a pumpable cake having a pH equal to 6.9 is obtained, which is then atomized using a nozzle atomizer.

The characteristics of the silica obtained (in the form of substantially spherical beads) are the following:

| BET surface area (m$^2$/g) | 158 |
|---|---|
| CTAB surface area (m$^2$/g) | 155 |
| Ø$_{50}$ (µm)* | 2.1 |
| F$_D$ (ml)* | 16.9 |
| V2/V1 (%) | 57 |

*after ultrasound deagglomeration

EXAMPLE 2

The following are introduced into a stainless steel reactor equipped with an impeller stirring system and with live steam heating in the reaction medium:
- 700 liters of water,
- 15.5 kg of Na$_2$SO$_4$ (electrolyte),
- 402 liters of aqueous sodium silicate, having an SiO$_2$/Na$_2$O weight ratio equal to 3.5 and a density at 20° C. equal to 1.230.

The concentration of silicate (expressed as SiO$_2$) in the stock is then 86 g/l. The mixture is brought to a temperature of 83° C. while keeping it stirred.

Then 489 liters of dilute sulfuric acid having a density at 20° C. equal to 1.050 (sulfuric acid with a concentration by weight equal to 7.7%) are introduced therein. The dilute acid is introduced at a flow rate of 546 l/h for the first 20 minutes of the reaction; the flow rate is then increased to 1228 l/h until the pH of the reaction medium reaches a pH value (measured at its temperature) equal to 8.0.

The reaction temperature is 83° C. for the first 20 minutes of the reaction; it is then brought from 83° C. to 92° C. over approximately 15 minutes, then held at 92° C. until the end of the reaction.

Next, 98.0 liters of aqueous sodium silicate of the type described above and 6.5 liters of concentrated sulfuric acid having a density at 20° C. equal to 1.83 (sulfuric acid with a concentration by weight equal to 95%) are introduced together into the reaction medium, this simultaneous introduction of concentrated acid and silicate being carried out so that the pH of the reaction medium, during this period of introduction, is always equal to 8.0±0.1.

After introducing all of the silicate, the concentrated acid continues to be introduced, at a flow rate of 20 l/h, for 6 minutes.

This additional introduction of acid then brings the pH of the reaction medium to a value equal to 4.8.

The total duration of the reaction is 60 minutes.

Compared to example 1, the following are observed:
- a gain in reaction productivity (relating to the final concentration, expressed as SiO$_2$, of the reaction medium and taking into account the reaction time) of 11%,
- a saving in the reaction water consumption of 10%,
- a saving in the reaction energy consumption (in the form of live steam) of 10%.

A slurry of precipitated silica is thus obtained, which is filtered and washed using a filter press so that a silica cake is finally recovered, the moisture content of which is 78% (therefore a solids content of 22% by weight). This cake is then fluidized by mechanical and chemical action (addition of an amount of sodium aluminate corresponding to an Al/SiO$_2$ weight ratio of 0.21%). After this disintegrating operation, a pumpable cake having a pH equal to 6.6 is obtained, which is then atomized using a nozzle atomizer.

The characteristics of the silica obtained (in the form of substantially spherical beads) are the following:

| BET surface area (m$^2$/g) | 157 |
|---|---|
| CTAB surface area (m$^2$/g) | 155 |
| Ø$_{50}$ (µm)* | 2.5 |
| F$_D$ (ml)* | 19.3 |
| V2/V1 (%) | 60 |

*after ultrasound deagglomeration

EXAMPLE 3

The following are introduced into a stainless steel reactor equipped with an impeller stirring system and with live steam heating in the reaction medium:
- 860 liters of water,
- 19.0 kg of Na$_2$SO$_4$ (electrolyte),
- 492 liters of aqueous sodium silicate, having an SiO$_2$/Na$_2$O weight ratio equal to 3.5 and a density at 20° C. equal to 1.230.

The concentration of silicate (expressed as SiO$_2$) in the stock is then 86 g/l. The mixture is brought to a temperature of 82° C. while keeping it stirred.

Then 232 liters of dilute sulfuric acid having a density at 20° C. equal to 1.050 (sulfuric acid with a concentration by weight equal to 7.7%) are introduced therein over the first 20 minutes of the reaction, and then 17 liters of concentrated sulfuric acid having a density at 20° C. equal to 1.83 (sulfuric acid with a concentration by weight equal to 95%) are introduced therein until the pH of the reaction medium reaches a value (measured at its temperature) equal to 8.0.

The reaction temperature is 82° C. for the first 20 minutes of the reaction; it is then brought from 82° C. to 92° C. over approximately 15 minutes, then held at 92° C. until the end of the reaction.

Next, 120 liters of aqueous sodium silicate of the type described above and 7.6 liters of concentrated sulfuric acid, of the type described above, are introduced together into the reaction medium, this simultaneous introduction of concentrated acid and silicate being carried out so that the pH of the reaction medium, during this period of introduction, is always equal to 8.0±0.1.

After introducing all of the silicate, the concentrated acid continues to be introduced, at a flow rate of 23 l/h, for 6 minutes.

This additional introduction of acid then brings the pH of the medium to a value equal to 4.8.

The total duration of the reaction is 65 minutes.

Compared to example 1, the following are observed:
- a gain in reaction productivity (relating to the final concentration, expressed as SiO$_2$, of the reaction medium and taking into account the reaction time) of 25%,
- a saving in the reaction water consumption of 26%,
- a saving in the reaction energy consumption (in the form of live steam) of 26%.

A slurry of precipitated silica is thus obtained, which is filtered and washed using a filter press so that a silica cake is finally recovered, the moisture content of which is 77% (therefore a solids content of 23% by weight). This cake is then fluidized by mechanical and chemical action (addition of an amount of sodium aluminate corresponding to an Al/SiO$_2$ weight ratio of 0.29%). After this disintegrating operation, a pumpable cake having a pH equal to 6.6 is obtained, which is then atomized using a nozzle atomizer.

The characteristics of the silica obtained (in the form of substantially spherical beads) are the following:

| | |
|---|---|
| BET surface area (m²/g) | 163 |
| CTAB surface area (m²/g) | 160 |
| Ø$_{50}$ (μm)* | 2.5 |
| F$_D$ (ml)* | 18.3 |
| V2/V1 (%) | 61 |

*after ultrasound deagglomeration

EXAMPLE 4

The following are introduced into a stainless steel reactor equipped with an impeller stirring system and with a heating jacket:

86.4 liters of water, 0.77 kg of Na$_2$SO$_4$ (electrolyte), 44.2 liters of aqueous sodium silicate, having an SiO$_2$/Na$_2$O weight ratio equal to 3.5 and a density at 20° C. equal to 1.230.

The concentration of silicate (expressed as SiO$_2$) in the stock is then 80 g/l. The mixture is brought to a temperature of 87° C. while keeping it stirred. The temperature is maintained at this value throughout the whole reaction.

Then 22.1 liters of dilute sulfuric acid having a density at 20° C. equal to 1.050 (sulfuric acid with a concentration by weight equal to 7.7%) are introduced therein over the first 20 minutes of the reaction, and then 1.46 liters of concentrated sulfuric acid having a density at 20° C. equal to 1.85 (sulfuric acid with a concentration by weight equal to 98%) are introduced therein until the pH of the reaction medium reaches a value (measured at its temperature) equal to 8.0.

Next, 10.7 liters of aqueous sodium silicate of the type described above and 0.69 liter of concentrated sulfuric acid, of the type described above, are introduced together into the reaction medium, this simultaneous introduction of concentrated acid and silicate being carried out so that the pH of the reaction medium, during this period of introduction, is always equal to 8.0±0.1.

After introducing all of the silicate, the concentrated acid continues to be introduced, at a flow rate of 2.0 l/h, for 6 minutes.

This additional introduction of acid then brings the pH of the reaction medium to a value equal to 4.8.

The total duration of the reaction is 60 minutes.

Compared to example 1, the following are observed:

a gain in reaction productivity (relating to the final concentration, expressed as SiO$_2$, of the reaction medium and taking into account the reaction time) of 37%, a saving in the reaction water consumption of 27%, a saving in the reaction energy consumption of 32%.

A slurry of precipitated silica is thus obtained, which is filtered and washed using a vacuum filter so that a silica cake is finally recovered, the moisture content of which is 85% (therefore a solids content of 15% by weight). This cake is then fluidized by mechanical and chemical action (addition of an amount of sodium aluminate corresponding to an Al/SiO$_2$ weight ratio of 0.27%). After this disintegrating operation, a pumpable cake having a pH equal to 6.8 is obtained, which is then atomized.

The characteristics of the silica obtained (in powder form) are the following:

| | |
|---|---|
| BET surface area (m²/g) | 155 |
| CTAB surface area (m²/g) | 164 |
| Ø$_{50}$ (μm)* | 2.8 |
| F$_D$ (ml)* | 12.6 |
| V2/V1 (%) | 58 |

*after ultrasound deagglomeration

The invention claimed is:

1. A process for preparing precipitated silica, the process comprising:
    precipitating a silicate and at least one acid using the following steps, whereby a suspension of precipitated silica is obtained:
    (i) forming an initial stock comprising a silicate and an electrolyte, wherein a concentration of silicate (expressed as SiO$_2$) in said initial stock is less than 100 g/l and, optionally, wherein a concentration of electrolyte in said initial stock is less than 19 g/l,
    (ii) adding an acid to said stock to form a reaction medium, wherein said acid is added until a pH value of the reaction medium of at least 7.0 is obtained, wherein the acid used before reaching a gel point in the reaction medium is sulfuric acid having a concentration of less than 20% by weight and wherein the acid used after reaching a gel point in the reaction medium is sulfuric acid having a concentration of at least 80% by weight,
    (iii) simultaneously adding sulfuric acid having a concentration of at least 80% by weight and a silicate to the reaction medium,
    (iv) adding sulfuric acid having a concentration of at least 80% by weight to the reaction medium, optionally until a pH value of the reaction medium of between 3.0 and 6.5 is obtained,
    separating a precipitate from the reaction medium, and drying the precipitate.

2. The process as claimed in claim 1, wherein the sulfuric acid having a concentration of at least 80% by weight in step (ii) is used after x minutes counting from the start of said step, with x being between 15 and 25.

3. The process as claimed in claim 1, wherein the concentration of silicate (expressed as SiO$_2$) in said initial stock is at least 80 g/l.

4. The process as claimed in claim 1, wherein the sulfuric acid having a concentration of at least 80% by weight used in at least one of steps (ii), (iii) and (iv) is sulfuric acid having a concentration of between 90% and 98% by weight.

5. The process as claimed in claim 1, wherein the separation comprises a filtration and a liquefaction of the cake resulting from the filtration, said liquefaction optionally being carried out in the presence of at least one aluminum compound.

6. The process as claimed in claim 1, wherein the drying is carried out by atomization.

7. The process as claimed in claim 1, wherein the acid is added to said stock in step (ii) until the pH of the reaction medium is between 7.0 and 8.5.

8. The process as claimed in claim 1, wherein the suspension of precipitated silica has a solids content of at most 24% by weight.

9. The process as claimed in claim 1, wherein the sulfuric acid having a concentration of at least 80% by weight used in step (ii) is sulfuric acid having a concentration of at least 90% by weight.

10. The process as claimed in claim 1, wherein the sulfuric acid having a concentration of at least 80% by weight used in step (iii) is sulfuric acid having a concentration of at least 90% by weight.

11. The process as claimed in claim 1, wherein the sulfuric acid having a concentration of at least 80% by weight used in step (iv) is sulfuric acid having a concentration of at least 90% by weight.

12. The process as claimed in claim 1, wherein the sulfuric acid having a concentration of at least 80% by weight used in all of steps (ii), (iii) and (iv) is sulfuric acid having a concentration of at least 90% by weight.

13. The process as claimed in claim 5, wherein the aluminum compound is an alkali metal aluminate.

* * * * *